US011535985B2

(12) United States Patent
Luo et al.

(10) Patent No.: US 11,535,985 B2
(45) Date of Patent: Dec. 27, 2022

(54) METHOD FOR MANUFACTURE OF PAPER OR BOARD AND PAPER OR BOARD OBTAINED BY THE METHOD

(71) Applicant: Kemira Oyj, Helsinki (FI)

(72) Inventors: Yuping Luo, Johns Creek, GA (US); Jennifer Riser, Marietta, GA (US); Zheng Dang, Lilburn, GA (US); Junhua Chen, Mableton, GA (US); Ronald Robinson, Newnan, GA (US); Andrew Pencek, Atlanta, GA (US); Barbara Lukasik, Atlanta, GA (US)

(73) Assignee: Kemira Oyj, Helsinki (FI)

( * ) Notice: Subject to any disclaimer, the term of this patent is extended or adjusted under 35 U.S.C. 154(b) by 179 days.

(21) Appl. No.: 16/916,173

(22) Filed: Jun. 30, 2020

(65) Prior Publication Data

US 2021/0002827 A1    Jan. 7, 2021

Related U.S. Application Data

(60) Provisional application No. 62/869,094, filed on Jul. 1, 2019.

(30) Foreign Application Priority Data

Aug. 5, 2019 (FI) ...................................... 20195663

(51) Int. Cl.
| | | |
|---|---|---|
| *D21H 11/16* | (2006.01) | |
| *D21H 17/37* | (2006.01) | |
| *D21H 17/56* | (2006.01) | |
| *D21H 21/10* | (2006.01) | |
| *D21H 23/16* | (2006.01) | |
| *D21H 23/76* | (2006.01) | |

(52) U.S. Cl.
CPC .......... *D21H 17/375* (2013.01); *D21H 11/16* (2013.01); *D21H 17/56* (2013.01); *D21H 21/10* (2013.01); *D21H 23/16* (2013.01); *D21H 23/765* (2013.01)

(58) Field of Classification Search
CPC ...... D21H 23/765; D21H 21/06; D21H 21/18; D21H 21/20; D21H 21/10; D21H 11/16; D21H 17/56; D21H 23/16; D21H 17/375
USPC ...................................................... 162/168.3
See application file for complete search history.

(56) References Cited

U.S. PATENT DOCUMENTS

| | | |
|---|---|---|
| 6,117,938 A | 9/2000 | Farinato et al. |
| 6,592,718 B1 | 7/2003 | Wong Shing et al. |
| 2003/0150575 A1 | 8/2003 | Hund et al. |
| 2009/0277597 A1 | 11/2009 | Hund et al. |

FOREIGN PATENT DOCUMENTS

| | | |
|---|---|---|
| CN | 109957066 A | 7/2019 |
| EP | 0730618 B1 | 12/1999 |
| NO | 0034582 A1 | 6/2000 |
| WO | 2016079383 A1 | 5/2016 |

OTHER PUBLICATIONS

Search report for corresponding Chinese patent application No. 2020800485631, dated Sep. 16, 2022, 2 pages.

*Primary Examiner* — Mark Halpern
(74) *Attorney, Agent, or Firm* — Meunier Carlin & Curfman LLC (57) ABSTRACT

A method for manufacture of paper or board, in which method an inverted solution of cationic polymer is added to the fiber suspension for providing retention enhancement without over-flocculating fiber stock and destruction sheet formation and/or improving drainage and enhancing or at least maintaining strength of paper or board, An inverted solution has a bulk viscosity of 50-150 mPas at 0.2 weight-% cationic polymer concentration and inverted solution comprises cationic polymer obtained by reverse phase emulsion polymerization of a monomer blend comprising non-ionic monomers, 15-50 mol-% cationic monomers, an optionally at most 50 ppm of a crosslinking agent, and a chain transfer agent, and the obtained reverse phase emulsion of cationic polymer is inverted into an aqueous solution.

21 Claims, 5 Drawing Sheets

METHOD FOR MANUFACTURE OF PAPER OR BOARD AND PAPER OR BOARD OBTAINED BY THE METHOD

CROSS-REFERENCE TO RELATED APPLICATIONS

This application is a U.S. nonprovisional application of the provisional application No. 62/869,094 filed on Jul. 1, 2019 and the Finnish application number 20195663 filed on Aug. 5, 2019 the contents of all of which are incorporated herein by reference.

FIELD OF THE INVENTION

The present invention relates to a method for manufacture of paper or board according to the independent claims presented below for improving retention and/or drainage. The invention also relates to a paper or board obtained by the method according to the present invention.

BACKGROUND OF THE INVENTION

Recycled fiber material is commonly used as raw material for paper or board. The recycled fiber material comprises in addition to the fibers a number of other substances. Particulate foreign material is separated from the pulp in the pulper or at the screening. Some substances are naturally retained on the fibers and do not disturb the process. Other substances, such as stickier, may be separated from the pulp at the screening and at least partly removed from the process.

Typically, recycled fiber material comprises starch, which has low molecular weight. This starch originates from the surface sizing of the paper or board. The starch retains poorly on the fibers as it typically has no charge at all or a slightly anionic charge, and due to its small size, it is not effectively separated at the screening either. Thus, the low molecular weight starch remains in the water circulation of the pulping process or is removed together with the screen effluent to the wastewater treatment. In the water circulation the starch increases the risk for microbial growth, as it is suitable nutritive substance for various microbes. Microbes may affect both the functioning of the chemistry of papermaking and the quality of the end product. High microbial activity can lower the pH and have a marked effect on wet-end chemistry. Slime formation, biofilms, on the surfaces of tanks and machine frames leads to paper defects, such as spots and holes, or web breaks when slime lumps are sloughing off. The amount of low molecular weight starch in the recycled fiber material may be relatively high, for example 1-3% of the total weight of the recycled fiber. When the starch is lost to the water circulation during pulp preparation process the yield of the process is naturally decreasing. Therefore, a process that would prevent the starch enrichment to the water circulation and assist it retention to the recycled fibers would provide numerous advantages.

Use of recycled fiber material as raw material is also the main source of hydrophobic substances, so called stickies, in the paper and board making. While some or even most of these hydrophobic substances are removed during the pulping of recycled fiber raw material, substantial amounts are still carried over to the paper or board making process. Hydrophobic substances, which have not been removed in deinking or other recycled fiber processing stage, and which are not trapped by the screens, enter the paper or board machine and circulate in the process waters. Due to the increased environmental awareness and regulations, papermaking processes have become more and more closed and use less fresh water. This results in heavy accumulation of interfering substances, including hydrophobic substances, in the fiber suspension and process waters. These substances may agglomerate into bigger hydrophobic particles, which are capable of forming deposits.

In addition to the recycled fiber material, recycle of coated broke can also cause similar problems as described above for the recycled fiber material. Coated broke contaminant deposition in papermaking systems can cause serious operational problems if left uncontrolled. Coated broke is repulped and used as a furnish source at most coated fine paper mills. The most difficult problem involved with recycling coated broke is derived from the binder materials, sometimes in combination with pigments or fillers, since these polymers and the materials to which they have been attached, are the origin of sticky deposits. These sticky deposits cause difficulties when recycled back to the paper machine operation.

The modern papermaking processes with high-speed machines are very sensitive to disturbances. One of the important factors limiting productivity on a high-speed paper machine is the formation of deposits. Formed deposits may cause web breakages, so as a precautionary measure the most affected surfaces, such as drying cylinders, calendars, wires and felts, are being regularly washed and cleaned, which leads to downtime and loss of production.

The circulating hydrophobic substances may be controlled by adding chemicals to the papermaking process in order to build a boundary layer of hydrophilic material around hydrophobic particles to decrease their tendency to deposit, i.e. to make them less tacky. The colloidal stability of small hydrophobic particles may be enhanced by surfactants and dispersants, which prevent their agglomeration and deposition on the surfaces. Cationic high charged polymers such as homopolymers of diallyldimethyl-ammonium chloride (DADMAC) are conventionally used as fixatives to control hydrophobic substances, such as pitch and stickies, through fixation. Non-ionic polymers, such as polyvinyl alcohol, and copolymers, such as polyacrylamide-vinyl acetate, have been used for stickies control through detackification. Alum, starches and low molecular weight cationic coagulants are used conventionally for deposit control, as they can neutralize anionic trash and detrimental substances including pitch and stickies at least partly by complex formation. However, it has been observed that these complexes may become concentrated in the process and lead to further deposition problems.

Conventional retention aid polymers, such as conventional polyacrylamide emulsions have also relatively high molecular mass values, which limit their dosage amounts in order not to over-flocculate fiber stock in the wet end. Over-flocculation is known to harm paper formation and to affect negatively paper strength. Typically, the molecular mass values of the conventional polyacrylamide emulsions are in the range of 10-20 million Dalton, which corresponds polymer standards viscosity >4.5 mPas.

There is a need for simple additives and their application systems to be used in manufacturing of paper and/or board, which provide retention enhancement without over-flocculating fiber stock and destruction sheet formation and which also enhance or at least maintain strength of paper or board.

SUMMARY OF HE INVENTION

It is an object of the present invention to reduce or even eliminate the above-mentioned problems appearing in prior art.

It is especially an object of the present invention to provide a method for manufacturing paper or board for improving retention and/or fixation of dyes, hydrophobics, starch and/or fillers in manufacture of paper and/or board. Further, one object of the present invention is to provide an effective method for eliminating or controlling deposit formation caused e.g. by hydrophobic substances in manufacture of paper or board. An object of the present invention is also to provide a method for improving drainage in manufacture of paper and/or board.

An object of the present invention is also to provide simpler application system (pump and go) especially for thick stock application or coated broke treatment without conventional polymer aging tanks.

According to another aspect, an object of the present invention is to provide a method for improving sizing efficiency in paper or board manufacturing.

In order to achieve among others the objects presented above, the invention is characterized by what is presented in the characterizing part of the enclosed independent claim. Some preferred embodiments of the invention will be described in the other claims.

The embodiments and advantages mentioned in this text relate, where applicable, both to the product, the method as well as to the uses according to the invention, even though it is not always specifically mentioned.

A typical method according to the invention for manufacture of paper or board, where a fiber web is formed from an aqueous suspension of fibers, the method comprising:
providing an aqueous fiber suspension, which comprises recycled fiber material and/or coated broke,
optionally diluting the aqueous fiber suspension,
delivering the aqueous fiber suspension to a headbox, draining the aqueous fiber suspension on a wire screen to form a wet fibrous web, and
pressing and drying the wet fibrous web to obtain a web of paper or board, wherein an inverted solution of cationic emulsion polymer is added to the fiber suspension having consistency of above 20 g/l prior to delivering the fiber suspension to a headbox, which inverted solution has a bulk viscosity of 50-150 mPas at 0.2 weight-% cationic polymer concentration and which inverted solution comprises cationic emulsion polymer inverted into an aqueous solution, said cationic emulsion polymer has a standard viscosity of 1.5-3.5 mPas, measured by Brookfield viscometer with UL adapter at 25° C. on a 0.1% by weight, polymer solution in 1 M NaCl and said cationic emulsion polymer is obtained by reverse phase emulsion polymerization of a monomer blend comprising non-ionic monomers, 15-50 mol-% cationic monomers, optionally at most 50 ppm of a crosslinking agent, and a chain transfer agent.

According to the present invention, an inverted solution of cationic emulsion polymer having a bulk viscosity of 50 to 150 mPas at 0.2 weight-% cationic polymer concentration is typically used as a fixative for improving retention and/or fixation of dyes, hydrophobics, starch and/or fillers in manufacture of paper and/or board, and/or as an additive for improving drainage, wherein said inverted solution comprising cationic emulsion polymer inverted into an aqueous solution, said cationic emulsion polymer having a standard viscosity of 1.5-3.5 mPas, measured by Brookfield viscometer with UL adapter at 25° C. on a 0.1% by weight, polymer solution in 1 M NaCl, and said cationic emulsion polymer is obtained by reverse phase emulsion polymerization of a monomer blend comprising non-ionic monomers, 15-50 mol-% cationic monomers, optionally at most 50 ppm of a crosslinking agent, and a chain transfer agent.

A typical paper or board according to the present invention is obtained by the inventive process or by the inventive use of the present invention.

Now it has been surprisingly found out that an inverted solution, which comprises a specified cationic emulsion polymer, is effective in many applications when added at wet end of the paper or board manufacturing process. It has been found that the cationic emulsion polymer according to the invention provides improved capability of retaining and fixing hydrophobics, ash, dyes, fines and/or starch, originating especially from recycled fiber materials and/or coated broke, to the fibers, and interacting with optional anionic papermaking additives thereby enhancing their performance and allowing higher dosage levels when desired. A method according to the present invention may improve deposit control by retention and/or fixation of hydrophobics. Further, it has been found that an inverted solution of cationic emulsion polymer according to the present invention provides improved dewatering rate.

The present invention is based on the cationic emulsion polymers having lower molecular weight and higher degree of branching than conventional retention aid polymers. In the method according to the present invention is used the cationic emulsion polymers with reduced molecular weight range which is suitable for thick stock fixative applications, such as pitch control, white pitch (coating latex) deposit control and retention boosting. According to the present invention cationic emulsion polymers may be branched or unbranched, but the branched emulsion polymers are found to more effectively enhance thick stock fixative treatments than unbranched polymers. According to preferred embodiment of the invention, the low standard viscosity (SV) values of emulsion polymer are achieved by using chain transfer agent(s) and a crosslinking agent to achieve certain degrees of branching in polymer chemistry. Hence, the properties of the cationic emulsion polymer make possible to avoid over-flocculation, that is known to harm paper formation and paper strength. Over-flocculation and destruction of sheet formation may be avoided even at elevated dosages of the cationic emulsion polymer used in the method of the present invention, and actually paper strength was even found to increase when used alone or together with conventional strength additives. Surprisingly, the cationic emulsion polymer according to the present invention was also found to improve sizing due to the cationic polymer's affinity to and capability to retain and fix hydrophobic materials like sizing agents themselves, starch that is commonly used for emulsifying internal sizing agents, and fines to which internal sizing agents are often associated with.

A method according to the present invention is applicable when fiber suspension comprises cellulosic fibers recycled from coated broke recovery. An emulsion polymer according to the present invention has found to fix the components of the binders contained in the coating of a coated broke, on the fibers and thereby controlling coated broke contaminant deposition in papermaking systems.

By a method according to the present invention, retention and/or fixation of dyes may also be improved. A drawback of conventional fixing additives is that they tend to change or bend shade of dyes, especially in more heavily dyed paper grades. The cationic emulsion polymer according to the present invention reduces or even eliminates this drawback.

In a method according to the present invention, it has also observed that a water-soluble cationic emulsion polymer may improve retention and/or fixation of starch in papermaking processes. Most importantly, low molecular weight (LMW) starch, that can be even with low or no charge, can be retained and/or fixed on fibers, as that is difficult to achieve with conventional retention aids. Also, retention of cationic wet-end starch might be improved, potentially allowing decrease of its dosage. The cationic charge assists in fixing the starch on anionic fibers. As a result of improved starch retention and/or fixation, cleaner filtrates such as filtrate from optional stock thickening step, or cleaner white water, can be obtained, improving the overall quality of water circulation at the paper mill.

It has also been found that the combination of low standard viscosity SV and high cationic charge of emulsion polymer according to the present invention significantly increase emulsion inversion rates in water. Achieving high emulsion inversion rates is important for the products to be used as "a pump and go" polyacrylamide emulsion. The present invention provides a much simpler application system (i.e. "pump and go") for thick stock application or coated broke treatment with no conventional emulsion aging tanks. Conventional polyacrylamide emulsions, such as cationic retention aids having molecular mass values in the range of 10 to 20 million Dalton (corresponds with polymer standard viscosity >4.5 mPas) do not instantly invert in water under a normal mixing speed (<500 RPM), and pre-diluted polymer solutions should be aged for a minimum of 30 minutes prior to use. Because of high polymer molecular weights of the conventional retention aid polymers, dosage level of them is typically limited below 0.45 kg/ton in order not to over-flocculate fiber stock in the wet end. The cationic emulsion polymers according to the present invention provide solution for over-flocculation problem and also make the emulsion according to the present invention to be used as a pump and go polymer emulsion.

It has also been observed that the polymer emulsions according to the present invention boost the strength and filler retention of the conventional strength program of glyoxalated polyacrylamide (GPAM) and/or anionic solution polyacrylamides. The emulsion polymers according to the present invention are also found to significantly improve filler content in sheets while still maintaining sheet strength levels. The present invention enables simultaneously both filler retention improvement and strength efficiency improvement which is essential in manufacturing of certain paper grades comprising mainly recycled fiber material, e.g. 100% recycled paper towel grades and high filler containing printing and writing grades.

DESCRIPTION OF THE DRAWINGS

The invention will be described in more detail with reference to appended drawings, in which.

DETAILED DESCRIPTION OF THE INVENTION

The cationic emulsion polymers suitable for use in the present invention are prepared by reverse phase emulsion polymerizing a monomer blend comprising non-ionic monomers and cationic monomers in the presence of a chain transfer agent to produce a cationic polymer product. According to the present invention cationic emulsion polymers may be branched or unbranched. According to an embodiment of the present invention, a water-soluble cationic emulsion polymer is prepared by polymerizing a monomer blend comprising non-ionic monomers, 15-50 mol-% of cationic monomers in the presence of a chain transfer agent. According to an embodiment of the present invention, the cationic polymer is a substantially linear polymer produced without crosslinking agent.

An emulsion polymer according to one preferred embodiment of the present invention is achieved by using a chain transfer agent and a crosslinking agent to achieve certain degrees of branching in polymer chemistry. The branched emulsion polymers are found to enhance thick stock fixative treatments more effectively than unbranched polymers. The molecular weight of emulsion polymer is reduced to a range which is especially suitable for thick stock fixative applications, such as pitch control, white pitch deposit control and retention boosting. When the cationic emulsions according to the present invention are added at increasing amount, such as even over 0.9 kg/ton produced paper or board, they provide great dosage latitude and performance enhancement range without over-flocculating fiber stock and damaging sheet formation.

According to one embodiment the cationic branched polymer comprises 15-50 mol-%, preferably 15-40 mol-%, and more preferably 20-40 or 20-30 mol-% of structural units derived from cationic monomers. The percentage values are calculated from the total dry weight of the polymer. Even 50 mol-% of cationic monomer were found to be effective at the 100% recycled paper mills, but the product safety regulation may be limiting issue if the cationic monomer mol-% go to higher than 30 mol-%.

According to one embodiment of the present invention a water-soluble cationic polymer is prepared by polymerizing a monomer blend comprising ethylenically unsaturated monomers. Typically, a water-soluble cationic polymer is prepared by polymerizing a monomer blend comprising at least non-ionic and cationic monomers, preferably non-ionic and cationic ethylenically unsaturated monomers. In an embodiment according to the invention a monomer blend may comprise non-ionic monomers, cationic monomers and anionic monomers. According to an embodiment of the invention, a water-soluble cationic polymer may be obtained by polymerizing a monomer blend comprising ethylenically unsaturated nonionic monomers, wherein 15-50 mol-%, preferably 15-40 mol-%, and more preferably 20-40 or 20-30 mol-% of the monomers are cationic or to be modified cationic e.g. by hydrolyzing units originating from N-vinyl formamide monomer into vinylamine.

According to one embodiment of the present invention, the cationic groups in the cationic polymer may originate from monomers selected from diallyldimethylammonium chloride (DADMAC); acryloyloxyethyltrimethylammonium chloride; methacrylates of N,N-dialkylaminoalkyl compounds; and quaternaries and salts thereof, such as N,N-dimethylaminoethylacrylate methyl-chloride salt; monomers of N,N-dialkylaminoalkyl (meth)acrylamides; and salts and quaternaries thereof, such as N,N-dialkylaminoethylacrylamides; methacrylamidopropyltrimethylammonium chloride; 1-methacryloyl-4-methyl piperazine and the like. Quaternary amines are preferred cationic monomers because their charge is not pH dependent.

According to one embodiment of the invention, the polymers suitable for use in the present invention are prepared by polymerizing a monomer blend which comprises one or more cationic monomer selected from above-mentioned list.

In an embodiment according to the present invention, nonionic monomers may comprise acrylamide; methacrylamide; N-alkyl acrylamides, such as N-methylacrylamide, N,N-dialkylacrylamides, such as N,N-dimethylacrylamide; methyl acrylate; methyl methacrylate; acrylonitrile; N-vinylmethylacetamide or formamide; N-vinyl acetate or vinyl pyrrolidone, and the like.

In one preferred embodiment according to the invention, water-soluble polymers comprise acrylamide and at least one ethylenically unsaturated cationic monomer.

A polymerization of the cationic polymer is conducted in the presence of a chain-transfer agent to control the structure and solubility of the polymer. In the absence of a chain-transfer agent, the incorporation of even extremely small amounts of crosslinking agent, e.g. 5 parts per million may cause crosslinking, rendering the polymer insoluble in water. However, soluble, highly branched, copolymer products are obtained in accordance with the present invention when a chain-transfer agent is used, in optimum concentration, in conjunction with said crosslinking agent. Many such chain-transfer agents are well known to those skilled in the art. These include alcohols; mercaptans; thioacids; phosphites and sulfites, such as isopropyl alcohol and sodium hypophosphite, although many different chain-transfer agents may be employed. According to a preferred embodiment of the present invention isopropyl alcohol is used as a chain transfer agent. It is extremely important that optimum concentrations of chain-transfer agent be employed in order to produce a water-soluble product. Addition of too little chain-transfer agent produces a non-soluble copolymer product and the addition of too much chain-transfer agent produces a product with too low a solution viscosity, i.e. molecular weight. According to an embodiment of the present invention, a chain-transfer agent is added in an amount of 300-500 ppm of monomer amount.

According to an embodiment of the present invention, polymerization of a monomer blend is conducted with a crosslinking agent to form the branched polymer. According to an embodiment of the present invention, a water-soluble cationic branched polymer is prepared by polymerizing a monomer blend comprising non-ionic monomers; 15-50 mol-%, preferably 15-40 mol-%, and more preferably 20-40 or 20-30 mol-% of cationic monomers; and a crosslinking agent in the presence of a chain transfer agent. The polyfunctional crosslinking agent comprises compounds having either at least two double bonds, a double bond and a reactive group or two reactive groups. Polyfunctional crosslinking agents should have at least some water-solubility. Examples of those compounds containing at least two double bonds are methylenebisacrylamide; methylenebismethacrylamide; polyethyleneglycol diacrylate; polyethyleneglycol dimethacrylate; N-vinyl acrylamide; divinylbenzene; triallylammonium salts; N-methylallylacrylamide; and the like. Polyfunctional crosslinking agents containing at least one double bond and at least one reactive group include glycidyl acrylate; acrolein; methylolacrylamide; and the like. Polyfunctional crosslinking agents containing at least two reactive groups include aldehydes, such as glyoxal; diepoxy compounds and epichlorohydrin and the like. Crosslinking agents should be used in sufficient quantities to assure a highly branched copolymer product. According to one preferred embodiment of the present invention methylene bis-acrylamide is used as a crosslinking agent. According to an embodiment of the present invention, a crosslinking agent content of at most 50 ppm and preferably in the range of 5-30 ppm or 10-20 ppm, based on initial monomer content, is added to induce sufficient branching of the polymer chain. According to an embodiment of the present invention, a degree of polymer branching by indicated index values (0.2% bulk viscosity/standard viscosity) is in the range of 100-200.

A water-soluble cationic emulsion polymer according to the present invention has a net cationic charge as measured at pH 7. In an embodiment according to the invention, a net cationic charge of the polymer is in the range of about 1.1 to 4.5 meq/g (dry), preferably 1.5 to 4.5 meq/g (dry), and more preferably 3.5 to 4.5 meq/g (dry), at pH 7. The higher the charge of the polymer, the greater hydrophobics, ash, dyes, fines and/or starch fixation efficiencies are achieved.

According to the present invention a water-soluble cationic emulsion polymer has standard viscosity below 3.5 measured in a Brookfield viscometer with a UL adapter at 25° C. on a 0.1 percent, by weight, polymer solution in 1 M NaCl at 60 rpm. According to the present invention, a water-soluble cationic emulsion polymer has standard viscosity typically in the range of 1.5-3.5 mPas, According to an embodiment of the preset invention, a water-soluble cationic emulsion polymer has standard viscosity of 1.7-3.3 mPas, preferably 1.7-3.0 mPas, more preferably 1.7-2.5 mPas and even more preferably 1.7-2.0 mPas, measured in a Brookfield viscometer with a UL adapter at 25° C. on a 0.1 percent, by weight, polymer solution in 1 M NaCl at 60 rpm. Standard (i.e. solution) viscosity SV values are relatively easier, i.e., less cumbersome and time consuming, to obtain than intrinsic viscosity values. Moreover, SV values can be correlated to W values for a particular polymer. Thus, polymeric molecular weights can be approximated by reference to the solution viscosity of the polymer. That is, the higher the SV value for a particular polymer, the higher its molecular weight. Commonly, 5 mPas of standard viscosity is equal to about 10 million Dalton of polymer molecular weight, and 2 mPas is about 2 million Dalton expressed as molecular weight. According to an embodiment of the present invention, 1.7-2.5 mPas of SV corresponds about 2-3 million Dalton of polymer molecular weight. According to one embodiment of the present invention, cationic branched polyacrylamide emulsions are achieved by using isopropyl alcohol as a chain transfer agents and methylene bis-acrylamide as a crosslinking agent to achieve certain degrees of branching in polymer chemistry. The molecular weight of cationic polyacrylamide emulsion is reduced to a range which is suitable for thick stock fixative applications, such as pitch control, white pitch deposit control and retention boosting. In addition, those Mw range does not destruct sheet formation at increasing dosage levels of the polymer.

The term "water-soluble" is understood in the context of the present application that the polymer product is fully miscible with water. When mixed with excess of water, the cationic emulsion polymer in the polymer product is preferably fully dissolved and the obtained polymer solution is preferably essentially free from discrete polymer particles or granules. Excess of water means that the obtained polymer solution is not a saturated solution.

A cationic polymer is obtained by emulsion polymerization. Polymerization techniques are widely known to persons skilled in the art. According to the invention, a water-soluble cationic polymer is prepared by reverse phase emulsion polymerization and the obtained reverse phase emulsion of cationic polymer is inverted into an aqueous solution. Therefore the cationic polymers used in the method of the present invention are inverse emulsion polymers. Emulsion polymerization procedures involve the preparation of two phases. The aqueous phase comprises the monomer(s), crosslinking agent and chain-transfer agent dissolved in deionized water, and other additives well known to those skilled in this art, such as stabilizers and pH adjusters. The oil phase comprises a water-insoluble hydrocarbon solution of surfactant(s). The aqueous phase and oil phase are then mixed and homogenized in a conventional apparatus until particle size is in the 1.0 micron range and a suitable bulk viscosity is obtained. The emulsion is then transferred to a suitable flask wherein the emulsion is agitated and sparged with nitrogen for about thirty minutes. A polymerization initiator, such as sodium metabisulfite solution, is then continuously added to the solution to begin polymerization. Polymerization is allowed to exotherm to the desired temperature which is maintained by cooling until cooling is no longer required. Finished emulsion product is cooled to 25° C.

Typically, dissolution of polymers gets more difficult and time-consuming when the molecular weight of the polymer increases. For use in many applications, complete dissolution of a polymer composition is required. One benefit of the obtained emulsion polymer is a quick inversion/dissolution rate. When the polymer composition is in form of an inverse emulsion, rapid and complete inversion and dissolution is required. Incomplete inversion and/or dissolution of the polymer composition may cause reduced performance when the polymer solution is being used. Preferably the complete inversion and dissolution of the polymer composition occurs quickly. For certain applications, it can be desirable to completely invert and dissolve the polymer composition to a final concentration of from 0.8 to 1 weight-% in less than 30 minutes, preferably in less than 10 minutes. The speed of inversion and dissolution of polymer composition can be measured e.g. using Anton Paar® Rheometer to measure the time needed to reach a maximum torque under mixing speed of 500 RPM, after the polymer composition, such as inverse emulsion polymer composition, has been injected to water at 0.1% active polymer concentration. The slope of viscous torque vs. dissolution time is calculated from Anton Paar® rheology curves to indicate polymer dissolution rate in water at a given polymer concentration level. The higher slopes indicate faster dissolution rates.

The combination of low standard viscosity and high cationic charge of the cationic branched polymer according to the present invention is found to increase emulsion inversion rates in water and make the emulsion to be used as so-called a pump and go polyacrylamide emulsion, A simpler application system is preferred for thick stock application or coated broke treatment with no conventional emulsion inverting and aging tanks. According to the present invention an inverted solution comprising a cationic emulsion polymer has a bulk viscosity of 50-150 mPas at 0.2 weight-% cationic polymer concentration. According to the present invention, bulk viscosity is measured from the 0.2 weight-% polymer solution in water at 25° C.; the 0.2 weight-% polymer solution is mixed for 45 minutes in order to complete invert the emulsion polymer, and then viscosity is measured using the Brookfield viscometer (Spidle #62 at 30 RPM of speed). Typically, polymer concentration in suitable pump and go application is in the range of 0.2 to 1 weight-%.

A cationic branched polymer according to the present invention can be used with one or more conventional papermaking additives such as: conventional anionic (e.g. HMW APAM) and/or cationic flocculants (e.g. HMW CPAM), conventional strength agents (e.g. cationic starch, glyoxylated polymers, polyamidoamine epichlorohydrins (PAE), LMW APAM, CMC, microfibrillar cellulose), cationic coagulants (alum, PAC, epi-amine etc.), drainage aids (e.g. PVAM, PEI, silica, bentonite, organic microparticles) and/or fillers, Cationic branched emulsion polymers according to the present invention at the standard viscosity (SV) range of 1.5-3.5 mPas are high enough in molecular weight to boost the strength and filler retention of the conventional strength program, and do not destruct sheet formation at increasing dosage levels. A method according to an embodiment of the present invention may comprise an addition of one or more conventional papermaking additives disclosed above.

It has been observed that the method according to the present invention has also advantages over typical solution anionic polyacrylamide with GPAM under high ash or high hardness alkaline papermaking conditions. The method according to the present invention with a cationic branched polymer boosts the strength performance of the conventional GPAM and/or APAM strength additives under alkaline papermaking conditions, particularly under high PCC filler loading conditions. It may also improve PCC filler content in sheets while still maintaining sheet strength levels compared to the conventional GPAM and/or APAM strength additives. Both filler retention improvement and GPAM strength efficiency improvement offer great commercial values especially in manufacturing 100% recycled fiber material paper or board grades.

A method according to the present invention may also improve deposit control by retention and/or fixation of hydrophobics, Hydrophobic substances, which have not been removed in deinking or other recycled fiber processing stage, and which are not trapped by the screens, enter the paper or board machine and circulate in the process waters. Due to the increased environmental awareness and regulations, papermaking processes have become more and more closed and use less fresh water. This results in heavy accumulation of interfering substances, including hydrophobic substances, in the fiber suspension and process waters. The terms "hydrophobics" or "hydrophobic substances" are in the present context fully interchangeable and synonymous and they are used herein to encompass all hydrophobic interfering substances present in papermaking, potentially causing deposits, including stickies and pitch. The term "stickies" means synthetic hydrophobes originating e.g. from adhesives, such as pressure sensitive adhesives, hot-melt adhesives, dispersion adhesives, and solvent adhesives, including styrene butadiene rubber (SBR), ethylene vinyl and polyvinyl acetate, polyvinyl acrylate, polyethylene, polyisoprene, polyisobutene, polybutadiene, polyamide, polyurethane, polyvinyl alcohol, polyvinyl propionate, polyvinyl ether, polyester, acrylic acid ester, block copolymers, wax, natural or modified resins; printing inks, such as absorbing, oxidizing, radiation curing printing inks and xenographic toners, including mineral oil, wax, hydrocarbon and alkyd resins, rosin esters, unsaturated fatty acids, epoxy, polyol, urethane, polyester, polyvinyl and styrene acrylates, polyester and hydroxyl polyester, SBR and polyvinyl butyral; coating binders, such as latex, including SBR, and polyvinyl acetates and acrylates; waxes used in cartons for packaging; and hydrophobic internal and surface sizing agents. The term "pitch" means natural hydrophobics and wood derivates, such as wood extractives, sterols, fatty acids, resin acids, fatty esters, including their salts and other forms thereof.

The present invention is efficient in controlling deposit formation of hydrophobic substances by fixing them onto the fibers. As used herein the concept "deposit formation control of hydrophobic substances" means prevention or reduction of deposit formation caused by the hydrophobic substances in a paper or board making process by their removal by fixation onto the fibers. In the present context the terms "fixation", "fixing" and "fix" means that the hydrophobic substances are associated or attached onto the fibers at least temporarily or permanently. According to one preferable embodiment of the invention the cationic emulsion polymer is used for controlling deposit formation caused by hydrophobic substances in manufacture of paper or board, where a fiber web is formed from an aqueous suspension of fibers, which comprises recycled fiber material.

Fiber suspensions comprising recycled fiber material and/or coated broke as containing elevated amounts of low molecular weight (LMW) starch, hydrophobics and/or fines benefit most from the addition of the cationic emulsion polymer according to the present invention, as well as paper grades with internal sizing.

According to an embodiment of the present invention, an inverted solution of cationic emulsion polymer is added to the fiber suspension, which comprises recycled fiber material and/or coated broke. In the present context, the term "fiber suspension" is understood as an aqueous suspension, which comprises fibers, preferably recycled fibers, and optionally fillers. For example, the fiber suspension may comprise at least 5%, preferably 10-30%, more preferably 11-19% of mineral filler. Mineral filler may be any filler conventionally used in paper and board manufacturing, such as ground calcium carbonate, precipitated calcium carbonate, clay, talc, gypsum, titanium dioxide, synthetic silicate, aluminium trihydrate, barium sulphate, magnesium oxide or their any of mixtures.

According to one embodiment the fiber suspension comprises at least 50 weight-%, preferably at least 60 weight-%, more preferably at least 70 weight-%, of recycled fiber material and/or coated broke, based on dry paper or board. In some embodiments the fiber suspension may comprise even >80 weight-%, or 100 weight-%, of fibers originating from recycled fiber materials and/or from coated broke. According to one preferable embodiment the recycled fiber material may be selected from old corrugated containerboard, mixed office waste, old newsprint, old magazines, double liner kraft, and any mixtures thereof. According to one preferable embodiment the recycled fiber material may be selected from old corrugated containerboard or mixed waste or old newsprint without deinking stage. Old corrugated containerboard (OCC) denotes recycled fiber material comprising corrugated containers, which have liners of test liner, jute or kraft, and the term may cover also double sorted corrugated containerboard (DS OCC). Mixed waste (MXW) denotes recycled mixture of recycled board, such as OCC, white lined chipboard and/or folding boxboard, and recycled paper, such as old newsprint, old magazines and/or office waste papers. Mixed office waste (MOW) denotes recycled fiber material mainly containing copying papers, printer papers and offset papers. Double lined kraft denotes recycled fiber material comprising clean sorted unprinted corrugated cardboard cartons, boxes, sheet or trimmings, e.g. of kraft or jute liner. White lined chipboard (WLC) denotes multiply board comprising deinked fiber material and/or undeinked recycled fiber material originating e.g. from OCC, mixed office waste or old newspapers (©NP) in or more of the layers. Presence of any of these recycled fiber materials in the fiber suspension usually decreases drainage and paper strength and provides a substantial load of hydrophobic dissolved and colloidal substances to the process. Processes employing recycled fibers and having an elevated load of hydrophobic substances in the fiber suspension benefit especially from the cationic branched polymer according to the present invention. It has been observed that not only the formation of the deposits is reduced but also the interference of the hydrophobics with conventional cationic retention agents, dry strength agents and wet strength agents is diminished. Washing of the process surfaces, such as wires and felts, may be reduced.

According to the present invention, broke can also be used as source of the cellulosic fibers. Paper, which during the paper making process becomes suitable only for repulping e.g. trimmings or paper that is out of specification is called as broke. This re-used material which never left the mill is not regarded as recycled. Broke is a valuable source of fiber and is recycled internally at the mill although it may also be sold to other mills as a source of fiber. Typically broke contains coatings that are applied to the base sheet of paper as it is being manufactured. When the broke contains these coatings, it is referred to as a coated broke, and presents special problems in recycling to recover fiber values because the coatings introduce materials which would not normally be present in the original stock of fiber used to manufacture the base paper sheet. The coated broke may also contain dyes and/or other additives. In the present application all kind of broke is called as coated broke including also surface-sized, dyed and/or creped broke. The present invention provides efficient method for treating cellulosic fibers recycled from coated broke recovery. The present invention provides polymers to fix hydrophobic stickies and recycled starches to fibers. The coated broke typically comprises hydrophobic coating materials, which now can be fixed efficiently into fibers by specified emulsion polymers.

According to the present invention, a cationic emulsion polymer may be added to the fiber suspension as a wet end chemical. An inverted solution comprising cationic emulsion polymer according to the present invention may be added to thick stock and/or to thin stock. Thick stock is here understood as a fibrous stock or furnish, which has consistency of above 20 WI, preferably above 25 g/l, more preferably above 30 WI. According to the present invention at least a part of an inverted solution of the cationic emulsion polymer is added to fiber suspension having consistency of above 20 g/l, preferably above 25 g/l and more preferably above 30 g/l. In an embodiment according to the present invention, a part of said inverted solution of water-soluble cationic emulsion polymer may be added to the thin stock having consistency of below 20 g/l. In thick stock, a water-soluble cationic emulsion polymer according to the present invention is preferably added to fiber fraction that benefits most of the addition. It may be added to a fiber fraction comprising elevated amounts of LMW starch, hydrophobics, fines, filler/pigment, dye or the like. A thick stock may comprise fiber fractions originating in different sources. When recycled fibers are used the cationic branched polymer is preferably added to the fraction comprising recycled fibers before it is mixed with optional other stock fractions, such as broke, kraft pulp or mechanical pulp. In an embodiment according to the present invention, an inverted solution of cationic polymer is added to the fiber suspension before washing and/or cleaning and/or thickening of the fiber suspension for improving filtering of the fiber suspension, wherein it may be achieved cleaner filtrate, and higher fines content in fiber suspension to which hydrophobics, sizing agent, fillers, dyes or the like can associate with. In an embodiment according to the invention, an inverted solution of cationic polymer is added to the fiber suspension before a machine chest, more preferably before a mixing chest, of a paper or board machine.

Addition of the inverted solution of cationic polymer to the fiber suspension before the thickening step are advantageous as the enrichment of the starch to the water circulation is effectively prevented in the most processes, and a large amount of starch is effectively retained on the fibers.

According to an embodiment of the present invention, an inverted solution of cationic emulsion polymer may be added to fiber suspension in an amount of 0.227-2.72 kg (as is)/ton produced paper or board. In thick stock treatments (fiber suspension having consistency of above 20 g/l) is commonly used higher dosage levels from 0.9 to 2.72 kg (as is)/ton produced paper or board or from 1.36 to 2.72 kg (as is)/ton produced paper or board, whereas in thin stock applications (fiber suspension having consistency of below 20 g/l) lower dosage levels from 0.227 to 0.45 kg (as is)/ton produced paper or board are typically adequate. When the cationic polymers are added at ever increasing amount, they provide great dosage latitude and performance enhancement range without over-flocculating fiber stock and damaging sheet formation.

A method according to the present invention with a cationic polymer may also be used to fix dyes. The present invention is observed to improve the retention of dyes. There are two parts to a coloring system on paper machines. The first is the selection of the actual coloring dyes. The second is the method by which the coloring dyes are attached or retained onto the sheet. There are three main coloring dyes that a papermaker considers in the selection of a coloring system: 1) cationic direct dyes, requiring a good polymer retention program on paper machines when the dye dosage is over 90 kg/ton; 2) anionic direct dyes, requiring a good polymer retention program on paper machines when the dye dosage is over 22.7 kg/ton; and 3) pigment dyes, requiring a good polymer retention program on paper machines when the dye dosage is just over 0.227 kg/ton. Conventional dye fixatives are polyamines and polyDADMACs, synthetic solution polymers. They are commonly used by the paper industry to provide retention of dyes, pigments and other fillers added to pulp. These conventional cationic dye fixatives have average molecular weight less than 500 000 Dalton. As total dye dosages are over 90 kg/ton to manufacture ultra-colored paper grades, the retention of dyes is limited by the low range of polymer molecular weights. Papermakers typically use high dosages of dye fixatives, such as 22.7 kg/ton of polyamine to improve the retention of dyes on paper machines. One drawback of conventional dye fixatives is that they tend to change shade especially in more heavily dyed paper grades. A cationic polymer according to the present invention alleviates or even eliminates this drawback. The present invention provides the following advantages over conventional dye fixatives in manufacturing heavily colored paper grades. A cationic polymer with desirable polymer molecular weight provide greater dosage latitude without over-flocculating fiber stock, and it achieves greater dye retention levels greater dye retention levels than the conventional dye fixatives. When branched cationic polymers of the present invention are added at even increasing amounts, such as over 4.5 kg/ton, they provide great dye retention enhancement without over-flocculating fiber stock and destruction of sheet formation.

Paper to be manufactured by the method according to the present invention may be any kind of paper or board comprising recycled fiber material and/or coated broke.

EXPERIMENTAL

Some embodiments of the invention are described in the following non-limiting examples.

Preparation of Polymers

The water-in oil polyacrylamide emulsions are synthesized via inverse emulsion polymerization process, which is composed of two-phase mixture where no reaction is expected to take place in the oil phase. The monomer phase contains monomers (arylamide, acryloyloxyethyltrimethylammonium chloride (Q9)), methylene bis-acrylamide (MBA) as a crosslinking agent, chain transfer agent, chelating agent, and surfactants. By changing Q9 and methylene bis-acrylamide content in the monomer phase, the polymer emulsions presented in Table 1 are synthesized.

700 grams of the polymer 667-7B is synthesized via inverse emulsion polymerization process, which is composed of two-phase mixture where no reaction is expected to take place in the oil phase. To a tared 1000 mL beaker (containing a magnetic stir bar), acrylamide (53 weight-%, 231 g) is added and stirred, then acryloyloxyethyltrimethylammonium chloride Q9-80 (180 g), citric acid (50%, 34.30 g), methylene bis-acrylamide (MBA; 3.99 g), isopropyl alcohol (2.1 g) and water (~58.5 g) are added to make the monomer phase mixture. The pH of this monomer mixture is adjusted between 6.0-6.5 using ammonium hydroxide. The temperature of the reactants is maintained below 30° C. To make the oil phase, Shellsol D-80 (paraffin solvent, 154.1 g) SMO (Arlacel 80AC, 12.54 g) and Tergitol L24-7 (8.45 g) are added to a tared 1L steel jug and stirred using an overhead mixer (at ~450 RPM) at least 10 minutes. The monomer mixture is slowly added to the oil phase and allowed to mix for about 20 minutes. The viscosity is measured and then the mixture is homogenized for 20 seconds (using a Ross Homogenizer operating at 4500 RPM). The viscosity is measured again after homogenizing. This mixture is poured into the polymerization reactor and the initiator tert-butyl hydroperoxide (Trigonox A-W70, 3.0%, 0.23 g) is added to the mixture after 1 hour of sparging and allowed to mix for 10 minutes. $SO_2$ gas (0.4%) at 18 SCCM is introduced and the temperature is monitored throughout the reaction. When an exotherm is observed (indicated by raise in temperature), it is signaling polymerization. The flow rate of $SO_2$ such that the raise in temperature is gradual (1° C./minute) is controlled. To obtain polymer of desired molecular weight, the temperature is maintained below 50° C. Completion of polymerization is indicated when no raise in temperature is seen even when $SO_2$ is continuously being fed. At the end of 1.5 hours, sodium metabisulfite (MBS) solution (30 wt %, 1.77 g) is added and mixed for ~10 minutes. A surfactant Tergitol L24-7 (at 1.43 wt %, 10 g) is added and mixed for ~20 minutes. The final emulsion has 0.2% bulk viscosity of 489 mPa and SV of 1.93 meas. SV was measured by a Brookfield viscometer with a UL adapter at 25° C. on a 0.2% by weight polymer solution in 1M NaCl at 60 rpm. By changing Q9 and methylene bis-acrylamide (MBA) content in the monomer phase, the polymer emulsions presented in Table 1 are correspondingly synthesized. E1596 presented in Table 1 is linear emulsion polymer.

TABLE 1

Cationic emulsion polyacrylamides (EPAMs)

| Polymer name | Q9 mole % of total monomers | MBA of total monomers (ppm) | Active Polymer Solids % | SV (mPas) | Emulsion Inversion Rate by Anton Paar slope of torque vs. inversion time |
|---|---|---|---|---|---|
| 677-7B | 30 | 38 | 40 | 1.93 | 5.8 |
| 677-14B | 40 | 38 | 40 | 2.15 | 6.2 |
| 677-1C | 30 | 28 | 40 | 2.59 | 5.6 |
| E1596 | 38 | 0 | 34 | 3.3 | 7.1 |

Anton Paar® Rheometer is used to measure the time needed to reach a maximum torque under the mixing speed of 500 RPM after the cationic EPAM has been injected to water at 0.1% active polymer concentration. The slope of viscous torque vs. inversion time is calculated from Anton Paar® rheology curves to indicate emulsion inversion rate in water at a given polymer concentration level. The higher slopes indicate faster emulsion inversion rates. Both E1596 and 677-14B provide high emulsion inversion rates (generated by Anton Paar® slope of torque vs. inversion time tests).

The slope values greater than 5.5 indicate that the EPAM products according to the present invention hold fast emulsion inversion rates, and hence these EPAM products can be used as pump and go polymers.

Test Methods
Handsheet Procedure

Handsheet studies were performed at various basis weights according the final product applications. The thick stock is diluted with white water and synthetic water (if needed) treated with desired calcium hardness and sodium sulfate to reach target conductivity. The pH of the diluted stock was adjusted to the value of the corresponded mill typical running condition. Dynamic Sheet Former was used to prepare the handsheets according to the standard protocol. Sheets were pressed at 15 psi and drum dried for 60 seconds. The sheets were post cured for 5 minutes at 105° C. Prior to the paper physical testing, the paper sheets were conditioned at least overnight at room temperature (73° F.) and 50% relative humidity. This follows the TAPPI T 402 om-93, Standard Conditioning and Testing Atmospheres for Paper, Board, Pulp hand sheet, and Related Products method.

Tensile Strength, Dry

Tensile strength is measured by applying a constant-rate-of-elongation to a sample and recording three tensile breaking properties of paper and paper board: the force per unit width required to break a specimen (tensile strength), the percentage elongation at break (stretch) and the energy absorbed per unit area of the specimen before breaking (tensile energy absorption). Only the dry tensile strength measurement is reported. This method is applicable to all types of paper, but not to corrugated board. This procedure references TAPPI Test Method T494. Twelve measurements were taken per condition and standard deviations were reported. A Thwing-Albert QC3A Series tensile tester was used for this study.

Tensile Strength, Immediate Wet

This test method is used to determine the wet tensile strength of paper and paperboard immediately after deionized water is brushed onto both sides of a paper sample. The wet tensile breaking strength is useful in the evaluation of the performance characteristics of tissue products, paper towels, bags and other papers subjected to stress during processing or use while wet. This method references TAPPI TEST Method T456. Eight measurements were taken per condition and averages were reported. A Thwing-Albert QC3A tensile tester was used.

Example 1: Emulsion Polymer as a GPAM Strength Performance Booster

Alkaline papermaking handsheets with the target basis weight of 74 g/m$^2$ were made using 50% bleached hardwood, 50% bleached softwood with additional 9% PCC filler. The headbox stock pH was around 8.3. The following GPAM strength boosting conditions were evaluated against the control 2.27 kg/ton of glyoxalated polyacrylamide (GPAM; Fennobond 3300 (Kemira Oyj):
 1) 2.27 dry kg/ton Fennobond 3300 as the control condition,
 2) 2.27 dry kg/ton Fennobond 3300 and 3.4 dry kg/ton anionic polyacrylamide FB85 (Kemira Oyj) as a GPAM strength promoter,
 3) 2.27 dry kg/ton Fennobond 3300, 3.4 dry kg/ton FB85 and 0.9 kg/ton emulsion polymer 677-14B.

Handsheet were prepared and tested as disclosed above in the test methods. The results are presented in FIG. 1.

Figure 1:
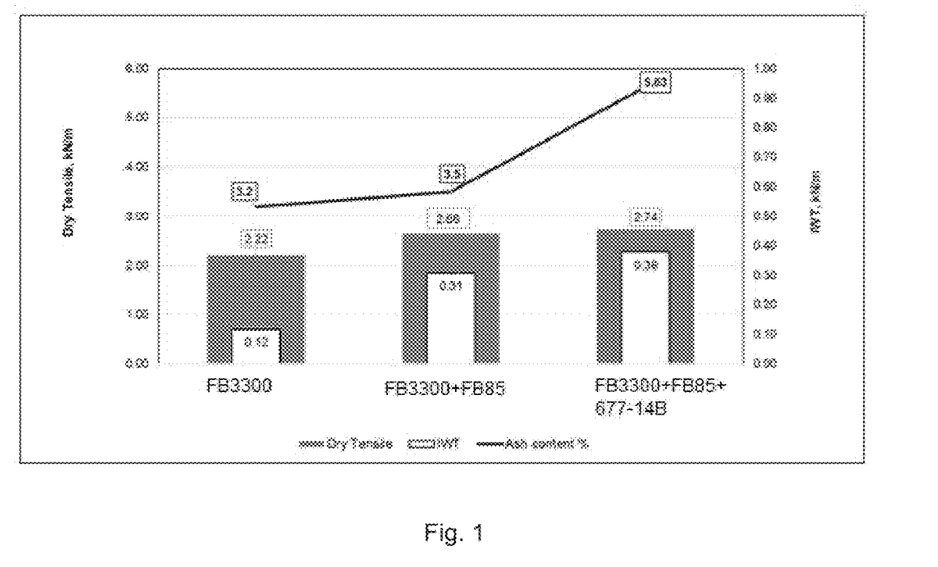
FIG. 1 shows results of Example 1: Emulsion polymer according to the present invention as a GPAM strength performance booster.

When using glyoxalated polyacrylamide Fennobond 3300 alone, it completely loses the dry and wet strength effectiveness under the alkaline wet end stock condition with 9% PCC filler loading. Conventionally, anionic polyacrylamide FB85 has been used to recover GPAM strength losses when the wet end stock pH is above 8.0.

By adding 0.9 kg/ton 667-14B cationic EPAM according to the present invention, the sheet ash content increased by 60% without sheet strength dropping. The EPAM according to the present invention provides significant strength efficiency improvement and sheet ash increase by 0.9 kg/ton of the EPAM product. The conventional cationic polymers cannot be used at such high dosage levels because it would destruct sheet formations.

Example 2: Emulsion Polymers as Anionic Dry Strength Resin Boosters

In this example, the target basis weight of handsheets were 74 gsm. The fiber furnish was made from standard lab pulp with 50% Softwood and 50% hardwood with no filler was added. The pulp was diluted to 0.54% using 150 ppm sulfate ions and 35 ppm of calcium ion. The pH of the diluted furnish was between 6.9 to 7.1. The ratio between anionic dry strength anionic polyacrylamide FennoBond 85 (FB 85; Kemira Oyj) to cationic polymer was 3:1 as dry solids basis.

Figure 2:
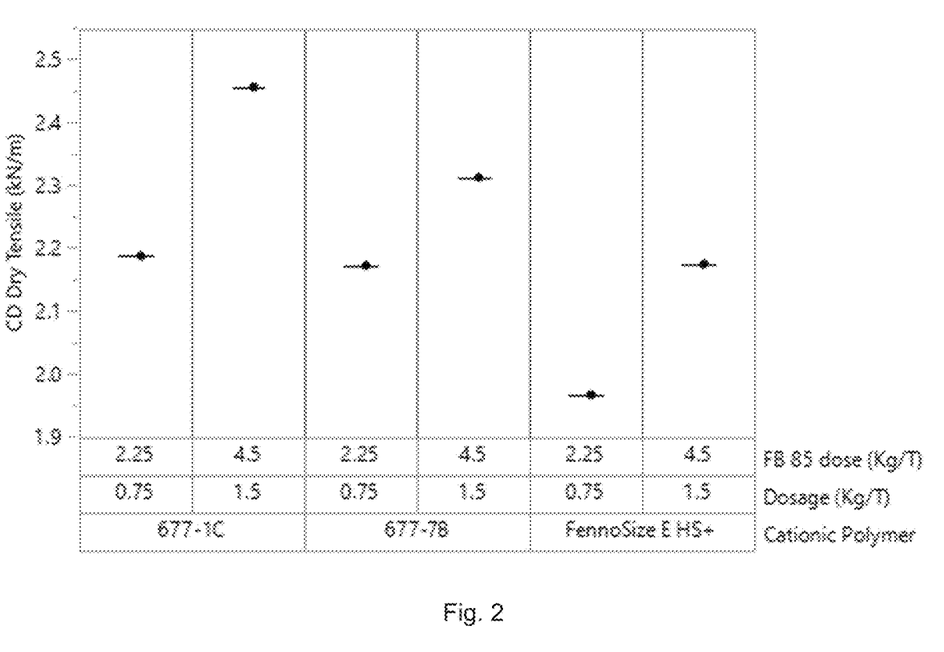
FIG. 2 shows results of Example 2: Emulsion polymers according to the present invention as anionic dry strength resin boosters.

Handsheets were prepared and tested as disclosed above in the test methods. The polymers and their addition amounts and the results are presented in FIG. 2. Emulsion polymer 677-1C according to the present invention offers 11.3% and 13% improvement on dry tensile at 2.25 kg/ton and 4.5 kg/ton of anionic polyacrylamide FennoBond 85 (FB 85; Kemira Oyj) respectively compared to a solution cationic polymer (FennoSize E HS plus; Kemira Oyj).

Example 3: Emulsion Polymers as Paper Strength Aids

In this example, the target basis weight of handsheets were 74 g/m². Standard lab pulp with 50% Softwood and 50% hardwood was used and diluted with 150 ppm sulfate ions and 35 ppm of calcium ion. The pH of the diluted furnish is between 6.9 to 7.1.

Figure 3:
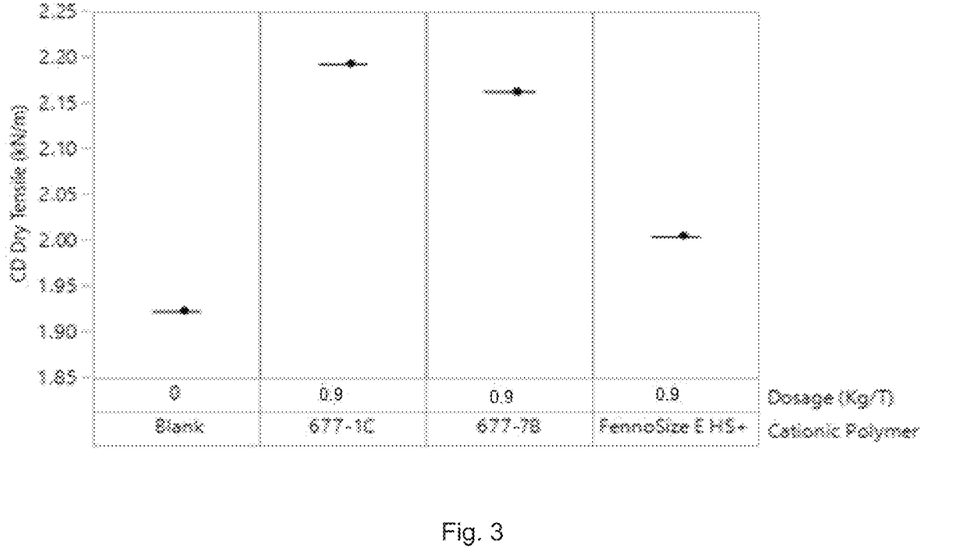
FIG. 3 shows results of Example 3: Emulsion polymers according to the present invention as paper strength aids.

Handsheets were prepared and tested as disclosed above in the test methods. The polymers and their addition amounts and the results are presented in FIG. 3. Emulsion polymers 677-1C and 677-7B according to the present invention offer 14% and 12.4% dry strength increase respectively at 0.9 kg/ton compared to blank experiments.

Example 4: Emulsion Polymers as Dye-Fixatives Against the Conventional Polyamine Emulsion polymers were studied to improve dye retention and to reduce the degree of dye contamination in colored mill effluents.

Alkaline papermaking handsheets with the target basis weight of 74 g/m² were made using 40% bleached hardwood, 10% bleached softwood, and 50% colored broke using current dye retention program (FF503-polyamine solution polymer (Kemira Oyj)/ER-9560R5 cationic emulsion polymer (Kemira Oyj) F52185 silica based microparticle retention aid system (Kemira Oyj)), Total dye usage was 296 kg/ton. Emulsion polymers 677-7B and 677-14B were used to replace FF503 in the current dye retention program (FF503-polyamine/ER-9560R5/F52185). The emulsion polymers 677-7B and 677—as dye fixatives were evaluated at two dosage levels against the control 22.7 kg/ton of FF503:

1) 22.7 kg/ton FF 503 as the control condition, 0.3 kg/t ER-9560RS and 0.9 kg/t FS2185,
2) 4.5 kg/ton EXP 677-7B (as is), 0.3 kg/t ER-9560RS and 0.9 kg/t FS2185,
3) 9 kg/ton EXP 677-7B (as is), 0.3 kg/t ER-9560RS and 0.9 kg/t FS2185,
4) 4.5 kg/ton EXP 677-14B (as is), 0.3 kg/t ER-9560RS and 0.9 kg/t FS2185,
5) 9 kg/ton EXP 677-14B (as is), 0.3 kg/t ER-9560RS and 0.9 kg/t FS2185.

Figure 4:
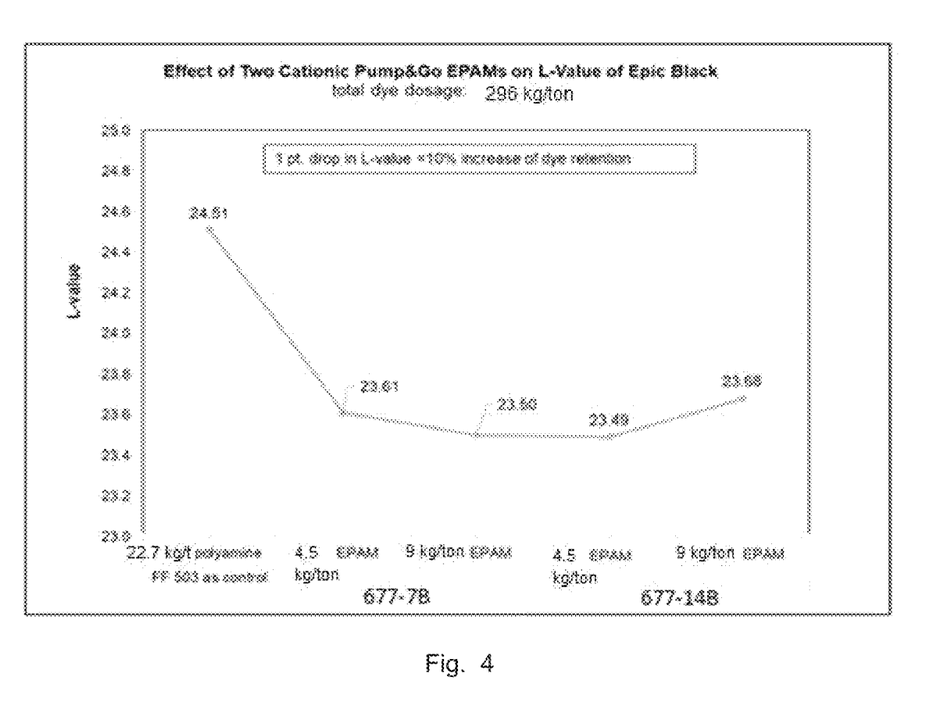
FIG. 4 shows results of Example 4: Emulsion polymers according to the present invention as dye-fixatives against the conventional polyamine.

Handsheets were prepared as disclosed above in the test methods. L-values are determined from the obtained colored handsheets by colorimetric spectrophotometer. Colorimetric Spectrophotometer uses a light source to illuminate the sample being measured. The sample signal falls onto a diode array, measuring the amount of light at each wavelength. The light reflected by the object passes to a grating which breaks it into its spectral components. The spectral data is sent to the processor where it is multiplied with user-selected illuminant and observer tables to obtain International Commission on Illumination (CIE) X, Y, Z color values. CIE L*, a*, b* scales are mathematically derived from CIE X, Y, Z values, and the current CIE recommendation is to use L*, a*, b*. CIE L* value is measured of a scale from 0 to 100 with 0 being black, and 100 being white. The following formula is used to determine L* value:

$$L^* = 116(Y/Y_n)^{1/3} - 16,$$

wherein Y is the CIE Y value, and
$Y_n$ is the CIE Y value of the reference white point (Y normalized).

The results are presented in FIG. 4. According to the L-values of those deep color handsheets measured by the spectrophotometer, there was a strong positive correlation between cationic emulsion polymers and reduction in L-value. ΔL-values were calculated by the L-value of each test condition minus the controls, One-point drop in handsheet L-value indicates more than 10% increase of total dye retention (equivalent to the savings of 29.5 kg/ton of dye to achieve the same target shade). Both emulsion polymers 677-7B and 677-14B with 30% and 40% monomer 09 at lower dosages offered promising results and increased dye retention by 10%.

Example 5: Reducing Cationic Emulsion Polymer Molecular Weight and Degree of Polymer Branching to Increase Coated Broke Fixative Treatment Efficiencies In this example, a series of 25 mol-% 09-polyacrylamide emulsion samples are synthesized via inverse emulsion polymerization process as disclosed more detailed above in the beginning of the experimental part ("preparation of polymers"). The resulted emulsion molecular weights decrease by increasing the sodium hypophosphite (chain transfer agent) content in the 25 mol-% cationic monomer 09 EPAM formulations. The following four polymer emulsions presented in Table 2 are synthesized with various sodium hypophosphite levels to target at different emulsion polymer molecular weights (indicated by emulsion standard viscosity values):

TABLE 2

Four Cationic emulsion polymers with Different Polymer Molecular Weights (with the same Q9 monomer content of 25 mole %)

| Product Name | Active Polymer Solids % | Sodium hypophosphite content of total monomers, ppm | SV (mPas) | Emulsion Inversion Rate by Anton Paar slope of torque vs. inversion time |
|---|---|---|---|---|
| 646-99A | 38 | 50 | 4.0 | 4.9 |
| 646-99B | 38 | 100 | 3.1 | 6.1 |
| 646-99C | 38 | 200 | 2.4 | 6.5 |
| 646-99D | 38 | 400 | 1.9 | 6.8 |

Figure 5:
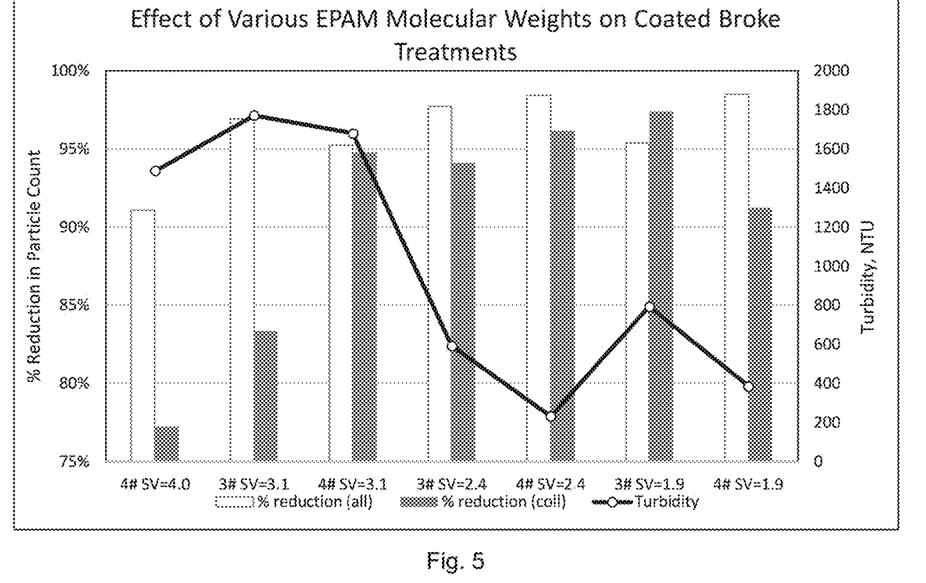
FIG. 5 shows results of Example 5: use of cationic emulsion polymers according to the present invention in coated broke treatment.

The effects of emulsion polymers on coated broke treatment are presented in FIG. 5 (the results of turbidity and Kemira Flyto analysis). In Figure, the dosage amounts are given by lb/ton.

The EPAM (646-99A) shows lower overall particle reduction and colloidal reduction and high turbidity. This signals low overall retention of colloidal and particulate material within the system.

The two EPAMs with lower SV values (646-99C and 646-99D) show the highest value for particle count reduction and colloidal count reduction. They also have lower turbidity values, indicating good overall retention. Colloidal retention is a measure of how much wood pitch and white pitch is being fixed within a colloidal system. The two lower SV samples (646-99C and 646-99D) yielded higher emulsion inverting rates than 636-99A.

Example 6: Reducing Cationic Emulsion Polymer Molecular Weight and Increasing Degree of Polymer Branching to Achieve Better Coated Broke Fixative Treatment Efficiencies An efficiency of cationic branched emulsion polymers according to the invention were studied in coated broke fixative treatment. The emulsion polymers are presented in Table 3. All cationic branched emulsion polymers are synthetized by using 30 mol-% cationic monomer 09 (acryloyloxyethyltrimethylammonium chloride) with different degrees of polymer branching. The polymerization process is disclosed more detailed above in the beginning of the experimental part ("preparation of polymers").

TABLE 3

| Product Name | Active Polymer Solids % | Degree of Polymer Branching by Indicated Index Values | SV, mPas | Emulsion Inversion Rate by Anton Paar slope of torque vs. time |
|---|---|---|---|---|
| 667-1A | 40 | 108 | 2.88 | 5.8 |
| 667-1B | 40 | 109 | 3.18 | 5.9 |
| 667-1C | 40 | 190 | 2.59 | 5.5 |
| 667-1D | 40 | 122 | 2.82 | 5.7 |

Figure 6:
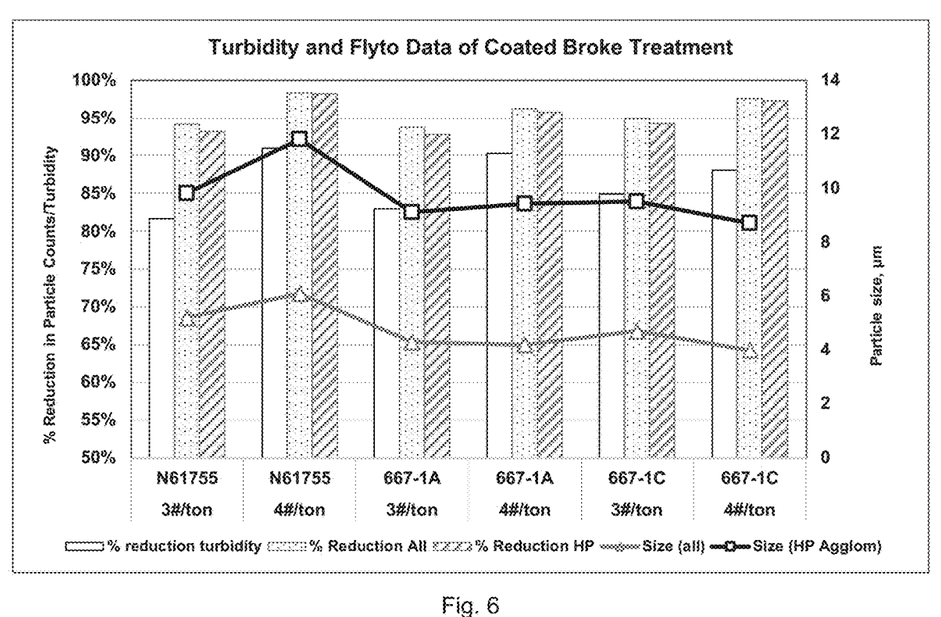
FIG. 6 shows results of Example 6: use of cationic emulsion polymers according to the present invention in coated broke treatment.

The results of turbidity and Kemira Flyto analysis are presented in FIG. 6. In Figure, the dosage amounts are given by lb/ton.

The molecular weights (measured by SV) and degree of polymer branching of the emulsion polymers both are characteristics to achieve good coated broke fixative treatment efficiencies.

The emulsion polymer 667-1C according to the present invention yields highest overall particle reduction and colloidal reduction and lowest turbidity. Colloidal retention is a measure of how much wood pitch and white pitch is being fixed within a colloidal system.

The conventional cationic retention aid polymers with SV value of >4.5 mPas cannot be used at such dosage levels because it would destruct sheet formations.

Example 7: Starch Residual Reduction in Mixed Office Waste Pulp (MOW)

Application of fixing agents in recovered MOW (mixed office waste) fiber stock is typically an approach to reduce starch residual in the system and ultimately reduce overall BOD levels of mill discharged water. Starch residual is measured using a potassium iodide/iodine reagent staining technique to quantify the amylose content in the filtrate of a stock solution after treating with process chemicals.

In this example, the MOW fiber stock is made from various sources of office copy papers. The final repulped MOW fiber stock yielded 4.0% consistency and stock pH at 8.3. Two polymer emulsions according to the present invention are tested as fixing agents against commercial dispersion polyacrylamide product Fennosil ES-325 (Kemira Oyj) as presented in Table 4.

TABLE 4

Two Cationic emulsion polymers vs. Fennosil ES-325 (Kemira Oyj)

| Product Name | Degree of Polymer Branching by Indicated Index Values | SV, mPas | Q9 Content, mol-5 |
|---|---|---|---|
| 667-1A | 108 | 2.88 | 30 |
| 667-1B | 109 | 3.18 | 30 |
| ES325 | linear | 3.70 | 10 |

Figure 7:
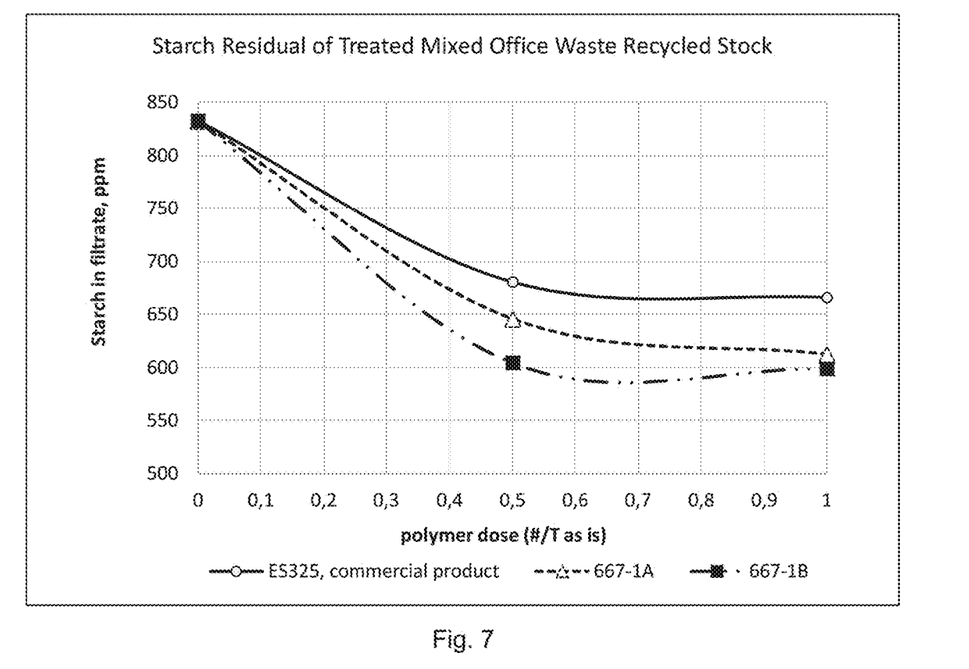
FIG. 7 shows results of Example 7: Starch residual reduction in mixed office waste pulp.

The results are presented in FIG. 7

Emulsion polymer 667-1B according to the present invention as the best fixing agent at 0.227 kg/ton (in Figure 0.5 lb/T) dosage level achieved 28% reduction in starch residual for the 4% consistency MOW recycled stock.

Example 8: Starch Residual Reduction and Hydrophobic and Colloidal Particle Reduction in Coated Broke Stock Starch is recirculated back in the broke from the coating formulations used on coated grades and can become a contributor to BOD in the whitewater loop. If the starch can be fixed to the fiber matrix, the overall system will be cleaner. Other hydrophobic and colloidal material is present in the coated broke that must be controlled in order to prevent deposition. A cationic branched emulsion polymer according to the present invention is useful in fixing both the residual starch and the hydrophobic and colloidal particulate material to the fiber, leaving a cleaner overall system.

In this example, coated broke was supplied at about 4% consistency and was treated with conventional broke control fixatives (FennoFix 501 (Kemira Oyj), Fennosil ES-325 (Kemira Oyj) and E-4737 (Kemira Oyj), and AxFix 210 (AxChem)) against three cationic branched emulsion polymers in a low shear environment. Filtrate was collected and analyzed for turbidity, residual starch content and particle count and size reduction (Kemira Flyto analysis).

TABLE 5

Conventional Fixatives vs. Three cationic branched emulsion polymers

| Product | Polymer Description | Active Polymer Solids % | SV, mPas | Polymer Branching Index |
|---|---|---|---|---|
| AxFix210 (AxChem) | 20 mol-% Q9, linear EPAM | 35 | 3.8 | 58 |
| FennoFix 501 | Polyamine solution with cationic charge of 6.5 meq/g | 50 | N/A | N/A |
| ES325 | 10 mol-% Q9, linear Dis-PAM | 20 | 3.7 | N/A |
| Kemira E-4737 | 10 mol-% Q9, linear EPAM | 33 | 2.7 | 98 |
| 667-1A | 30 mol-% Q9 structured quick inversion EPAM | 38.3 | 2.88 | 108 |
| 667-1B | 30 mol-% Q9 structured quick inversion EPAM | 38.3 | 3.18 | 109 |
| 667-1c | 30 mol-% Q9 structured quick inversion EPAM | 38.3 | 2.42 | 157 |

Figure 8:
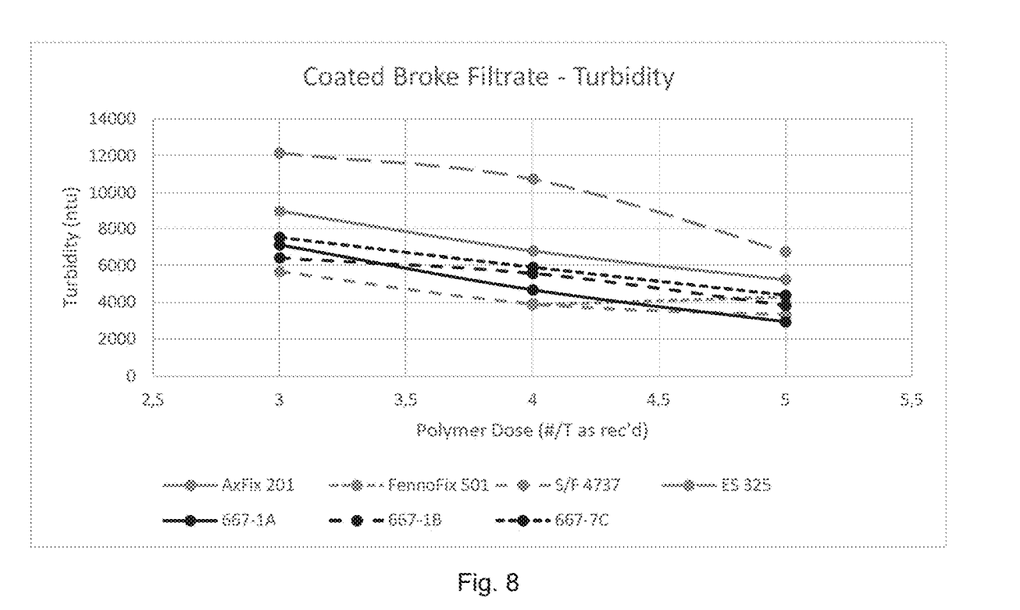
FIGS. 8-10 show results of Example 8: Starch residual reduction and hydrophobic and colloidal particle reduction in coated broke stock.
Figure 9:
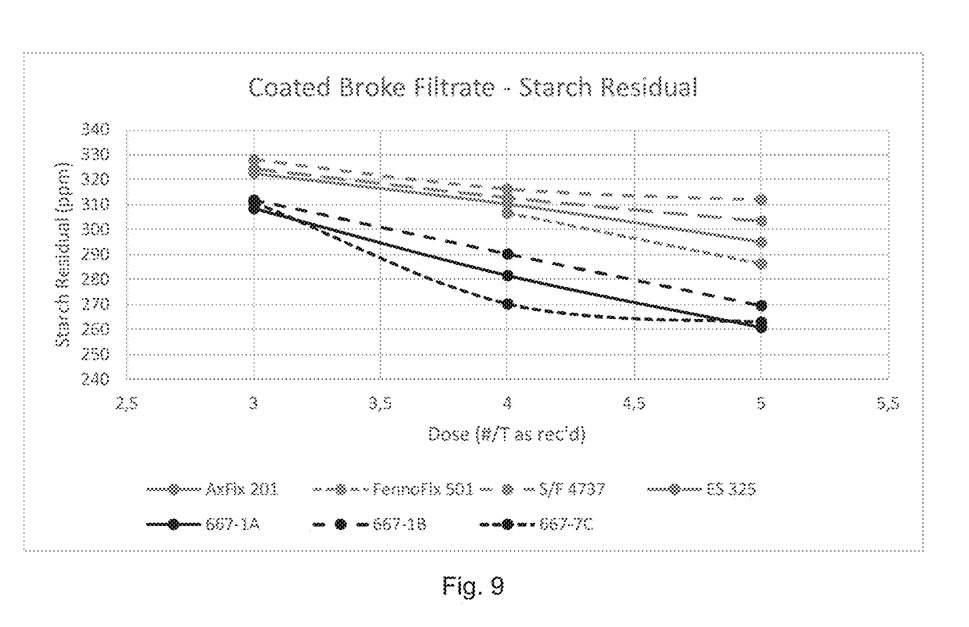
Figure 10:
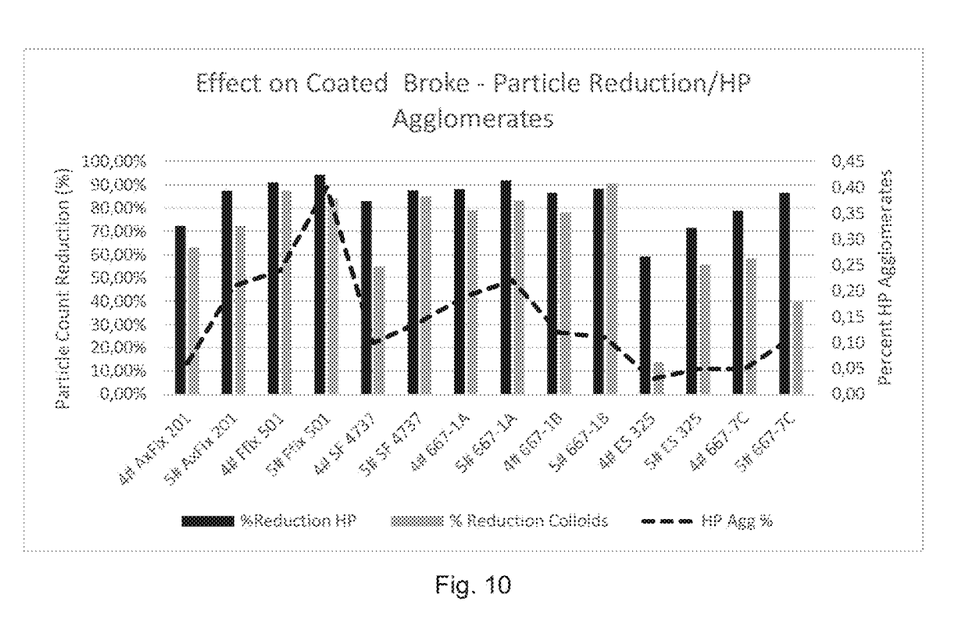

The results are presented in FIGS. 8-10. Emulsion polymer 667-1A proved to be best at cleaning up the overall filtrate, with an 85.9% reduction in turbidity at 2.27 kg/ton (in FIG. 5 lb/T) as received dosage.

Emulsion polymer 667-1A proved also to be best for starch residual control, followed closely by emulsion polymers 667-7C and 667-1B, At 2.27 kg/ton (in FIG. 5 lb/T) as received dosage, the 667-1A achieved a 27.0% reduction in starch residual in the filtrate.

Emulsion polymer 667-1B does the best job of reducing overall hydrophobic (HP) and colloidal particles without creating agglomerations of hydrophobic material. Increasing amounts of hydrophobic agglomerates lead to problems with deposits on the paper machine. The ability of 667-1B to control hydrophobic and colloidal material without causing agglomeration makes it particularly useful in treating coated broke in thick stock addition.

Coated broke treatment polymers were evaluated for performance based on controlling turbidity, starch residual impact, total hydrophobic and colloidal particle reduction and hydrophobic agglomerate particle size increase. The polymers were ranked according to their performance across all criteria and are shown in the Table 6 below. The emulsion polymer 667-1A according to the present invention is the best polymer overall for coated broke applications, followed closely by the emulsion polymer 667-1B. In FIG. 10, the dosage amounts are given by lb/ton.

TABLE 6

Polymer Performance in Coated Broke Application (1 = best; 7 = worst)

| | Turbidity | Starch Residual | All Particle Reduction | HP Particle Reduction | HP Agg Particle Reduction | Colloidal Particle Reduction | HP Agg Size Increase | Total Scoring |
|---|---|---|---|---|---|---|---|---|
| 1 | 667-1A | 667-1A | FFix 501 | FFix 501 | 667-1B | 667-1B | 667-7C | 667-1A (2.14) |
| 2 | E-4737 | 667-7C | 667-1A | 667-1A | ES 325 | 667-1A | FFix 501 | 667-1B (2.57) |
| 3 | 667-1B | 667-1B | 667-1B | 667-1B | 667-7C | FFix 501 | 667-1A | FFix 501 (3.00) |
| 4 | FFix 501 | FFix 501 | E-4737 | E-4737 | 667-1A | E-4737 | 667-1B | 667-7C (4.14) |
| 5 | 667-7C | AxFix 201 | 667-7C | AxFix 201 | E-4737 | AxFix 201 | E-4737 | E-4737 (4.43) |
| 6 | AxFix 201 | ES 325 | AxFix 201 | 667-7C | FFix 501 | ES 325 | ES 325 | AxFix 201 (5.86) |
| 7 | ES 325 | E-4737 | ES 325 | ES 325 | AxFix 201 | 667-7C | AxFix 201 | ES 325 (5.86) |

Example 9: Effect on Dewatering Rates in Broke Stock Application

The emulsion polymer according to the present invention synthetized by using 30 mol-% cationic monomer Q9 (acryloyloxyethyltrimethylammonium chloride) and having SV of 1.7 mPas was recently tested as a broke thickener. The work was done on-site at the mill. The mill slushes their broke at consistency of 4% and then dewater to 10% for increased capacity in the high-density broke chest. The water removal process is energy and time intensive. The use of the emulsion polymer according to the present invention was tested to improve the de-watering rate. The invention polymer was added into the dilution water prior the stock mixing with the 4% consistency broke at a dosage of 200-350 grams/dry ton of pulp (10-20 ppm on a vol/vol basis), A trial using the polymer according invention to improve the broke stock dewatering rates was very successful, giving a 25% production gain (speed) with the invention, which was confirmed in the laboratory with DDA testing. The thickened broke stock containing the polymer according to the present invention would also contribute residual cationic charge to the wet end system and boost the paper machine retention and drainage (CPAM, APAM and bentonite).

The invention claimed is:

1. A method for manufacture of paper or board, where a fiber web is formed from an aqueous suspension of fibers, the method comprising:
    providing an aqueous fiber suspension, which comprises at least 50 weight-% of recycled fiber material and/or coated broke, based on dry paper or board;
    optionally diluting the aqueous fiber suspension;
    adding to the fiber suspension having consistency of above 20 g/l an inverted solution of cationic polymer, the inverted solution of cationic polymer having a bulk viscosity of 50 to 150 mPas at 0.2 weight-% cationic polymer concentration, and comprising a reverse phase emulsion of a branched or unbranched cationic polymer having a standard viscosity of 1.5-3.5 mPas measured by Brookfield viscometer with UL adapter at 25° C. on a 0.1% by weight, polymer solution in 1 M NaCl, and said cationic polymer being obtained by reverse phase emulsion polymerization of a monomer blend comprising non-ionic monomers, 20-40 mol-% cationic monomers, optionally at most 50 ppm of a crosslinking agent;
    delivering the aqueous fiber suspension to a headbox, draining the aqueous fiber suspension on a wire screen to form a wet fibrous web; and
    pressing and drying the wet fibrous web to obtain a web of paper or board.

2. The method according to claim 1, wherein a cationic net charge of the cationic polymer is in the range of 1.1-4.5 meq/g (dry), at pH 7.

3. The method according to claim 1, wherein the reverse phase emulsion of cationic polymer has a standard viscosity of 1.7-3.3 mPas, measured by Brookfield viscometer with UL adapter at 25° C. on a 0.1% by weight polymer solution in 1M NaCl.

4. The method according to claim 1, wherein the amount of the crosslinking agent is preferably in the range of 5-30 ppm.

5. The method according to claim 1, wherein the monomer blend comprises one or more ethylenically unsaturated monomers.

6. The method according to claim 1, wherein the cationic monomers comprise one or more selected from diallyldimethylammonium chloride (DADMAC); acryloyloxyethyltrimethylammonium chloride; methacrylates of N,N-dialkylaminoalkyl compounds; and quaternaries and salts thereof, such as N,N-dimethylaminoethylacrylate methyl-chloride salt; monomers of N,N-dialkylaminoalkyl (meth)acrylamides; and salts and quaternaries thereof, such as N,N-dialkylaminoethylacrylamides; methacrylamidopropyltrimethylammonium chloride; 1-methacryloyl-4-methyl piperazine and the like.

7. The method according to claim 1, wherein the nonionic monomers comprise one or more selected from acrylamide; methacrylamide; N-alkyl acrylamides, such as N-methylacrylamide, N,N-dialkylacrylamides, such as N,N-dimethylacrylamide; methyl acrylate; methyl methacrylate; acrylonitrile; N-vinylmethylacetamide or formamide; N-vinyl acetate or vinyl pyrrolidone, and the like.

8. The method according to claim 1, wherein said inverted solution is added to fiber suspension having consistency of above 30 g/l.

9. The method according to claim 1, wherein a part of the inverted solution is added to fiber suspension having consistency of below 20 g/l.

10. The method according to claim 1, wherein said inverted solution is added to the fiber suspension before washing and/or cleaning and/or thickening of the fiber suspension.

11. The method according to claim 1, wherein said inverted solution is added to fiber suspension having consistency of above 20 g/l in an amount of 0.9-2.72 kg (as is)/ton produced paper or board.

12. The method according to claim 11, wherein said inverted solution is added to fiber suspension having consistency of above 20 g/l in an amount of 1.36-2.72 (as is)/ton produced paper or board.

13. The method according to claim 1, wherein a cationic net charge of the cationic polymer is in the range of 1.5-4.5 meq/g (dry), at pH 7.

14. The method according to claim 13, wherein a cationic net charge of the cationic polymer is in the range of 3.5-4.5 meq/g (dry), at pH 7.

15. The method according to claim 1, wherein the reverse phase emulsion of cationic polymer has a standard viscosity of 1.7-3.0 mPas, measured by Brookfield viscometer with UL adapter at 25° C. on a 0.1% by weight polymer solution in 1M NaCl.

16. The method according to claim 1, wherein the reverse phase emulsion of cationic polymer has a standard viscosity of 1.7-2.0 mPas, measured by Brookfield viscometer with UL adapter at 25° C. on a 0.1% by weight polymer solution in 1M NaCl.

17. The method according to claim 1, wherein the fiber suspension comprises at least 60 weight-% of recycled fiber material and/or coated broke, based on dry paper or board.

18. The method according to claim 17, wherein the fiber suspension comprises at least 70 weight-% of recycled fiber material and/or coated broke, based on dry paper or board.

19. The method according to claim 18, wherein the fiber suspension comprises at least 80 weight-% of recycled fiber material and/or coated broke, based on dry paper or board.

20. The method according to claim 19, wherein the fiber suspension comprises 100 weight-% of recycled fiber material and/or coated broke, based on dry paper or board.

21. A paper or board obtained by a method according to claim 1.

* * * * *